US012747307B2

(12) United States Patent
Grimm et al.

(10) Patent No.: US 12,747,307 B2
(45) Date of Patent: Sep. 29, 2026

(54) METHOD OF PREPARING ALDEHYDE-FUNCTIONALIZED POLYMERS

(71) Applicant: ECOLAB USA INC., St. Paul, MN (US)

(72) Inventors: Herman Mark Grimm, Eagan, MN (US); Mei Liu, Eagan, MN (US); David Jordan, Eagan, MN (US); Nathan Jones, Eagan, MN (US)

(73) Assignee: ECOLAB USA INC., St. Paul, MN (US)

( * ) Notice: Subject to any disclaimer, the term of this patent is extended or adjusted under 35 U.S.C. 154(b) by 751 days.

(21) Appl. No.: 17/971,597

(22) Filed: Oct. 22, 2022

(65) Prior Publication Data

US 2023/0128251 A1 Apr. 27, 2023

Related U.S. Application Data

(60) Provisional application No. 63/271,079, filed on Oct. 22, 2021.

(51) Int. Cl.

*C08F 8/28* (2006.01)
*C08F 220/56* (2006.01)
*C08F 226/04* (2006.01)
*D21H 17/37* (2006.01)
*D21H 21/20* (2006.01)

(52) U.S. Cl.

CPC .............. *C08F 8/28* (2013.01); *C08F 220/56* (2013.01); *C08F 226/04* (2013.01); *D21H 17/375* (2013.01); *D21H 21/20* (2013.01); *C08F 2800/20* (2013.01); *C08F 2810/10* (2013.01)

(58) Field of Classification Search

CPC ........ C08F 8/28; C08F 220/56; C08F 226/04; C08F 2800/20; C08F 2810/10; D21H 17/375; D21H 21/20

See application file for complete search history.

(56) References Cited

U.S. PATENT DOCUMENTS

| | | | | |
|---|---|---|---|---|
| 7,520,162 | B2 * | 4/2009 | Wenger | G01F 1/8418 73/861.357 |
| 8,197,640 | B2 | 6/2012 | Schaffer | |
| 8,920,606 | B2 | 12/2014 | Wright | |
| 10,006,170 | B2 | 6/2018 | Grimm et al. | |
| 2006/0162886 | A1 | 7/2006 | Smith et al. | |
| 2020/0079950 | A1 * | 3/2020 | Karppi | D21H 17/45 |
| 2020/0087859 | A1 * | 3/2020 | Jackson | D21H 17/51 |
| 2020/0166444 | A1 * | 5/2020 | Anklin | G01N 11/16 |

FOREIGN PATENT DOCUMENTS

| | | | | |
|---|---|---|---|---|
| WO | WO-2021186109 A1 * | 9/2021 | | D21H 21/18 |

* cited by examiner

*Primary Examiner* — Kumar R Bhushan

(74) *Attorney, Agent, or Firm* — HYLTON-RODIC LAW PLLC

(57) ABSTRACT

A method is provided for generating aldehyde-functionalized polymers such as GPAM, wherein progress of the aldehyde-functionalized polymer formation is monitored by measuring viscosity using an online viscometer. A method is also provided for enhancing paper strength, said method comprising generating an aldehyde-functionalized polymer, such as GPAM, according to the present disclosure, and combining said aldehyde-functionalized polymer with a fiber slurry or applying it to a paper sheet.

12 Claims, 4 Drawing Sheets

METHOD OF PREPARING ALDEHYDE-FUNCTIONALIZED POLYMERS

CROSS REFERENCE TO RELATED APPLICATIONS

This application claims priority to U.S. Application No. 63/271,079, filed on Oct. 22, 2021, the contents of which are hereby incorporated by reference in its entirety.

FIELD OF THE INVENTION

The invention relates to methods of generating aldehyde-functionalized polymers for papermaking, and more particularly using a process control that includes viscometry.

BACKGROUND

Glyoxalated polyacrylamide (GPAM) is a common strength aid used in the paper industry. GPAM may include a polyacrylamide backbone that has been modified to contain charged monomers (often cationic). This modified polyacrylamide backbone is reacted with glyoxal, a crosslinker used to build branching and increase molecular weight. The resulting GPAM is used in the papermaking process to increase bonding between fibers and enhance strength, typically through wet end addition or sprayed onto the formed paper sheet. GPAM can also increase paper machine efficiency through enhanced press dewatering.

Crosslinking is typically carried out until the desired molecular weight of the GPAM has been reached. The molecular weight needs to be high enough to facilitate fiber/fiber bonding, but not so high that it causes excessive flocculation and poor sheet formation, which can lower strength. The reaction endpoint is often determined by either turbidity or viscosity.

Viscosity measurements have been used for measuring reaction progress during the generation of GPAM materials. To avoid overshooting the endpoint viscosity measurements are made periodically during the reaction on aliquots withdrawn from the reaction mixture (commonly referred to as "spot checking" or "grab sampling"). In other instances, viscosity measurements are made in real time in a continuous reaction using an inline viscometer, such as a spindle viscometer (i.e., a viscometer that includes a spindle arrangement) wherein the spindle is placed directly into the reaction mixture, and viscometry measurements are made frequently, or essentially continuously, see e.g., U.S. Patent Publication No. 2005/0161181; see also, see U.S. Pat. No. 8,920,606.

Inline viscometers that have a spindle or other probe over which the fluid must flow in order to obtain viscosity measurements are prone to be clogged by fluids that are too viscous, such as gels. For example, U.S. Pat. No. 7,875,676 describes a method for preparing a cellulose reactive polyvinylamide adduct, in which an aqueous reaction mixture of a vinylamide polymer and a cellulose reactive agent are continuously reacted, while measuring the viscosity during the reaction. When the viscosity reaches a target level (e.g., no more than 30 cP at a temperature of 25° C.), the reaction is stopped. Such methods where the viscosity of adducts is measured involve problems to the effect that, if the moment for stopping the reaction is overlooked, the viscosity may increase too much, and a water-insoluble gel is formed, which can interfere significantly with further viscosity readings. This is because the probe or spindle of the viscometer tends to get stuck because of the gelling of the GPAM product.

Due to the challenges of monitoring the formation of GPAM and other aldehyde functionalized polymers (AFP) by measuring the change in viscosity, measuring turbidity is frequently used as an alternative. For example, U.S. Pat. No. 8,920,606 describes a method for preparing a cellulose reactive polyvinylamide adduct. The disclosed adduct formation showed only a very moderate increase in viscosity, a slight decrease in viscosity, or no increase at all. It was observed for the method disclosed therein that as the glyoxalation of the vinylamide polymer proceeds, the turbidity of the reaction solution increases. Thus, the adduct formation method may be monitored using a turbidimeter or a viscometer.

The '606 patent further discloses that, turbidity measurements can be useful to monitor adduct formation when the reaction takes place at or below the Critical Concentration. Turbidity can be measured using a conventional turbidimeter, such as SURFACE SCATTER 7SC turbidimeter, a continuous-monitoring instrument designed for measuring turbidity in fluids. The instrument design is based on the nephelometric principle, where light scattered by particles suspended in the fluid is measured to determine the relative amount of particulate matter in the fluid. Viscosity typically can be measured during the reaction using the UL adapter for a BROOKFIELD LV series viscometer (a spindle viscometer). One difference between the adduct disclosed in the '606 patent and the GPAM polymer product of the invention (an exemplary embodiment) is that the change in viscosity of the adduct disclosed in the '606 patent is much lower than the change in the viscosity of the GPAM product of the invention (which involves a more than 100% increase in viscosity). A key challenge with using traditional viscometers (such as a spindle viscometer) for monitoring preparation of aldehyde functionalized polymers (such as GPAM) is that these polymers tend to continue crosslinking resulting in the formation of a gelled product which tends to clog the viscometer because of a buildup of the gelled product. Accordingly, monitoring using a spindle viscometer would be ineffective. As a result, preparation of aldehyde functionalized polymers (such as GPAM) is typically monitored by assessing the change in turbidity. A major disadvantage of using turbidity to monitor the progress of the reaction is that turbidity measurement vary from batch to batch and are therefore unreliable.

There is a long felt need for a method of preparing GPAM using a suitable arrangement of a viscometer that can monitor reaction viscosity continuously, without malfunctioning in the case that gelation of the reaction mixture occurs. Further, there is a long felt need to provide a feedback loop that includes continuous viscometry measurements to enable a reliable reaction control, such as automated quenching of the reaction mixture once a target viscosity level is achieved for the preparation of GPAM. This is an especially critical need where the increase in viscosity occurs very rapidly during the preparation of GPAM, thereby eliminating the opportunity to monitor progress of the reaction by grab sampling or spot checking.

For preparation of GPAM quenching of the crosslinking reaction presents unique challenges, the crosslinking reaction via glyoxal is facilitated by basic pH and is usually quenched by lowering the pH to less than about pH 3, typically by adding a strong acid such as sulfuric acid to the reaction mixture. The use of such strong acids can pose various safety risks, especially when used on a manufacturing scale. Therefore, there is a need for a milder acid quenching agent that can effectively quench the reaction to form a GPAM product, while still providing a useful shelf life of the product.

Despite the quenching process that is used to manufacture GPAMs, latent crosslinking can still occur and, over time, will cause the polymer solution to gel and be unusable. This results in a short shelf-life for the product (15-45 days at room temperature). Heat increases the crosslinking reaction, shortening the shelf-life further in warm climates. To prolong shelf-life, the polymer solids of GPAM solutions are often kept very low (less than 10%). There are then significant disadvantages to GPAMs produced off-site at chemical plants; due to the low solids, high volumes of the product are needed to meet the needs of the papermaker. The short shelf-life also increases the complexity of chemical logistics and storage at the customer site. Safety is also a concern due to the high volumes of chemical that need to be handled by mill personnel. There are also drawbacks from a sustainability standpoint, in that the vast majority of the product being transported is water (over 90% by weight). There is a need for a process of generating GPAM that eliminates or greatly reduces such shelf-life issues.

Another challenge is where the change in viscosity occurs rapidly at the end of the reaction without a marked change in the clarity of the reaction solution. Turbidity measurements require a marked difference in the clarity of the solution being monitored. Therefore, turbidity is ineffective to monitor product formation in instances where there is little if any change in the clarity of the polymer product. One feature of the method of preparing GPAM as described herein is that the clarity of the resulting GPAM polymer product does not change in a markedly or meaningful way. As a result, turbidity is not useful to assess the end point of the reaction described herein.

Incidentally, as mentioned above, traditional viscometers are also not useful because they are susceptible to fouling and clogging from gelling of the GPAM product. Furthermore, inline viscometers that require spot samplings are ineffective since the reaction ends so quickly that the end point is easily missed. In fact, the increase in viscosity at the end of the method of the invention is so large (roughly 100-500%) that monitoring by spot checking is ineffective because the end point is easily missed. Without wishing to be bound by any particular theory, it is believed that commercial GPAM prepared by traditional manufacturing methods are more suitable for shipping and have a longer shelf life while the GPAM of the invention is more suited to an onsite preparation and use.

In some embodiments, the reaction is quenched by adjusting the pH of the reaction solution to a value in a range from about 2 to about 4; from about 3 to about 4; from about 3.5 to about 4. In some embodiments, the methods described herein involves quenching the crosslinking reaction at a higher pH (about 4-6) than typically used when preparing conventional commercial GPAM. For example, the reaction is quenched by adjusting the pH of the reaction solution to a value in a range from about 4.2 to about 6; from about 4.4 to about 6; from about 4.6 to about 6; from about 4.8 to about 6; from about 5 to about 6; from about 5.5 to about 6. In some embodiments the shelf life of the GPAM prepared according to the methods disclosed herein is shorter than conventional commercial GPAM prepared offsite and is therefore not suitable for shipping over long distances (which typically occurs in the preparation of most commercial GPAM).

This background information is provided for the purpose of making information believed by the applicant to be of possible relevance to the present invention. No admission is necessarily intended, nor should it be construed, that any of the preceding information constitutes prior art against the present invention. In addition, the preceding information should not be construed to mean that a search has been made or that no other pertinent information as defined in 37 CFR § 1.56(a) exists.

SUMMARY

The present disclosure provides methods for generating GPAM and for using the same. It is believed that the mono-reacted species (e.g., species having a free aldehyde) is responsible for the increased paper strength because, unlike the di-reacted species, the mono-reacted species can form a covalent bond with cellulose fiber.

In order to achieve the appropriate level of crosslinking that maximizes mono-reacted amide, higher levels of glyoxal are used in relation to the level of acrylamide (G/A). The same is true where other aldehydes aside from glyoxal is used in the crosslinking reaction. While these reactions are normally carried out at alkaline pH (for example above pH 7; above pH 8; about pH 8-9.5) the viscosity increases by 300-400% over the starting viscosity with very little turbidity noted and without gelling when using acrylamide copolymers with weight average molecular weight less than 30,000 Daltons. Unfortunately, the end point in this viscosity growth is tricky to predict and poses a risk during manufacturing to quench the product before gelation. This obstacle has prevented onsite manufacturing GPAM of the MW described herein to date. There is a long felt need in the art to manufacture GPAM onsite that has a high G/A ratio. The growth rate in viscosity observed while making the critical concentration reacted polymer as spelled out in herein (typically less than 50% increase) is marginal.

Periodically or continuously checking of viscosity with various spindle type meters typically utilized in manufacturing of GPAM with higher reacted cross linking practiced by those skilled in the art is currently known. Turbidity—the traditional alternative to measuring viscosity—is not suitable for monitoring the formation GPAM for the methods disclosed herein. Consequently, the increase/change in viscosity needs to be measured to monitor the progress of formation of GPAM and a means of knowing when the endpoint of the reaction of step (a) disclosed herein has been reached an increase 300-500% in viscosity over the starting point to reach the desired reacted polymer endpoints.

Under these circumstances, there is a need for an open online flow tube type viscometer to reliably measure viscosity while giving continuous feedback. The advantage of using this type of viscometer is that it doesn't have any form of probe or spindle which over time will plug with GPAM thereby causing erroneous viscosity measurements and subsequent off spec batches. This online viscometer gives continuous feedback of viscosity while allowing for operation of the acid quench step at the immediate desired time, which is necessary since preparing GPAM as disclosed herein involve a rapid increase/change in viscosity over a short period of time (see FIG. 1). FIG. 1 shows how quickly the viscosity increases on the later part of the reaction.

The online viscometer also allows for feedback tied to the caustic pump (i.e., alkaline source) to allow for increasing or decreasing the reaction rate depending on required time to reach the endpoint of the crosslinking reaction of step (a).

TABLE A

| Comparison of BASF GPAM vs GPAM (exemplary embodiment) | | | | | | |
|---|---|---|---|---|---|---|
| Date | sample | Unreacted glyoxal, % | unreacted amide, % | mono amide, % | di amide, % | mono/di, ratio |
| Mar. 3, 2020 | BASF 555 | 69 | 88 | 6 | 6 | 1:1 |
| Aug. 15, 2014 | BP612 | 77 | 80 | 16 | 5 | 3.2:1 |

GPAM prepared according to the methods disclosed herein are exceptional for press dewatering characteristics and this is due to its higher mono amide. To achieve this higher amount of glyoxal are often needed leading to increased chance of producing higher viscosity material (which may be prone to gelling). The downside is that doing this leads to higher chance of gelation. With the accuracy of the repeatable online viscometer as disclosed herein, measuring the flow characteristics of the fluid viscosity changes now allows for this to be done without the attention of sample monitoring, which is necessary when using traditional inline viscometer, known to foul over short periods of time because of gelation of GPAM.

One aspect of the invention pertains to a method of generating GPAM, said method comprising:

combining at least a polyacrylamide and glyoxal to obtain a reaction solution; and quenching the reaction by adjusting the pH of the reaction solution to a value in a range from about 2 to about to obtain said GPAM;

wherein progress of the reaction is monitored by measuring the viscosity of the reaction solution (e.g., via feedback loop) from an online viscosity meter.

Another aspect of the invention pertains to a method of generating GPAM, said method comprising:

(a) combining at least a polyacrylamide and glyoxal to obtain a reaction solution; and (b) quenching the reaction by adjusting the pH of the reaction solution to a value in a range from about 2 to about 6 (or about 4 to about 6) to obtain said GPAM;

wherein the progress of the reaction is monitored by measuring the viscosity of the reaction solution (e.g., via feedback loop) from an online viscosity meter;

wherein said polyacrylamide has a weight average molecular weight of about 7,000-50,000 Daltons;

wherein said reaction is quenched when the reaction solution is a viscosity in the range of about 12 cp to about 40 cP.

A further aspect of the invention pertains to a method of generating GPAM, said method comprising:

(a) combining at least a polyacrylamide and glyoxal to obtain a reaction solution; and (b) quenching the reaction by adjusting the pH of the reaction solution to a value in a range from about 2 to about 6 (or about 4 to about 6) to obtain said GPAM;

wherein the progress of the reaction is monitored by measuring the viscosity of the reaction solution (e.g., via feedback loop) from an online viscosity meter;

wherein said polyacrylamide has a weight average molecular weight of about 50,000-200,000 Daltons;

wherein said reaction is quenched when the reaction solution is a viscosity in the range of about 20 cP to about 1,000 cP.

Another aspect of the invention pertains to a method of generating GPAM, said method comprising:

(a) combining at least a polyacrylamide and glyoxal to obtain a reaction solution; and (b) quenching the reaction by adjusting the pH of the reaction solution to a value in a range from about 2 to about 6 (or about 4 to about 6) to obtain said GPAM;

wherein the progress of the reaction is monitored by measuring the viscosity of the reaction solution (e.g., via feedback loop) from an online viscosity meter;

wherein said polyacrylamide has a weight average molecular weight of about 15,000 Daltons;

wherein said reaction is quenched when the reaction solution is a viscosity in the range of about 10 cP to about 100 cP.

A method for enhancing paper strength and press section dewatering of a paper sheet on a paper machine comprising adding to the paper sheet about 0.05 lb/ton to about 20 lb/ton, based on dry fiber, of an aqueous composition prepared by a method comprising (a) initiating a crosslinking reaction to generate GPAM by combining at least a polyacrylamide and glyoxal to obtain a reaction solution;

(b) quenching the reaction by adjusting the pH of the reaction to a value in a range from about 2 to about 6 (or about 4 to about 6), once a target viscosity of the GPAM is met;

wherein the progress of GPAM formation is monitored by measuring the viscosity of the reaction solution (e.g., via feedback loop) from an online viscosity meter (e.g. a vibration viscometer)

(c) combining said GPAM of step (c) with a fiber slurry or applying said GPAM to a paper sheet.

A further aspect of the invention pertains to a GPAM composition comprising GPAM prepared according to the method of preparing GPAM as disclosed herein, wherein said GPAM has a weight average molecular weight of from about 10,000 g/mole to 10,000,000 g/mole and wherein said GPAM has a glyoxal to acrylamide (G/A ratio) in the range of about 0.1:1 to about 20:1, 0.1 to about 1 to about 20 to about 1, about 0.4 to about 1 to about 20 to about 1, or 0.4:1 to 20:1, or 0.4:1, or 0.8:1.

A yet further aspect of the invention pertains to a method of generating aldehyde-functionalized polymer, said method comprising:

(a) combining at least a polymer comprising at least one amide group or amino group and an aldehyde to obtain a reaction solution; and (b) quenching the reaction by adjusting the pH of the reaction solution to a value in a range from about 2 to about 6 (or about 4 to about 6) to obtain said aldehyde-functionalized polymer;

wherein progress of the reaction is monitored by measuring the viscosity of the reaction solution (e.g., via feedback loop) from an online viscosity meter.

DETAILED DESCRIPTION

Definitions

The following definitions are provided to determine how terms used in this application, and in particular, how the claims are to be construed. The organization of the definitions is for convenience only and is not intended to limit any of the definitions to any particular category.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

"AA" means acrylic acid.

"AcAm" means acrylamide.

"Wet End" means that portion of the papermaking process prior to a press section where a liquid medium such as water typically comprises more than 45% of the mass of the substrate, additives added in a wet end typically penetrate and distribute within the slurry.

"Dry End" means that portion of the papermaking process including and subsequent to a press section where a liquid medium such as water typically comprises less than 45% of the mass of the substrate, dry end includes but is not limited to the size press portion of a papermaking process, additives added in a dry end typically remain in a distinct coating layer outside of the slurry.

"Acrylamide monomer" means a monomer of formula

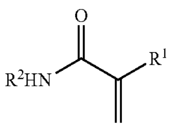

wherein $R^1$ is selected from the group consisting of H, $C_1$-$C_{16}$ alkyl, aryl, arylalkyl, $C_2$-$C_{16}$ alkenyl, $C_2$-$C_{16}$ alkynyl, heteroaryl, alkylheteroaryl, $C_3$-$C_8$ cycloalkyl, and halogen; and $R^2$ is selected from the group consisting of hydrogen, $C_1$-$C_{16}$ alkyl, aryl, arylalkyl, $C_2$-$C_{16}$ alkenyl, $C_2$-$C_{16}$ alkynyl, heteroaryl, alkylheteroaryl, and hydroxyl.

"Aldehyde" means a compound containing one or more aldehyde (—CHO) groups, where the aldehyde groups are capable of reacting with the amino or amide groups of a polymer comprising amino or amide groups as described herein. Representative aldehydes include formaldehyde, paraformaldehyde, glutaraldehyde, glyoxal, and the like.

"Aldehyde-functionalized polymer" (is used interchangeably with the acronym "AFP") to refer to a polymer that results from a reaction between a polymer comprising at least one amide group or amino group with an aldehyde. The term "aldehyde-functionalized polymer" encompasses an aldehyde-functionalized polymer composition or mixture containing unreacted aldehyde. The term "aldehyde-functionalized polymer" also encompasses an aqueous aldehyde-functionalized polymer composition or mixture containing unreacted aldehyde.

"Alkenyl" refers to a straight or branched hydrocarbon, preferably having 2, 3, 4, 5, 6, 7, 8, 9, 10, 11, 12, 13, 14, 15, or 16 carbons, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups may be unsubstituted or substituted by one or more suitable substituents.

"Alkyl" refers to a straight-chain or branched alkyl substituent. Examples of such substituents include methyl, ethyl, propyl, isopropyl, n-butyl, sec-butyl, isobutyl, tert-butyl, pentyl, isoamyl, hexyl, and the like.

"Alkylheteroaryl" refers to an alkyl group linked to a heteroaryl group.

"Alkynyl" refers to a straight or branched hydrocarbon, preferably having 2, 3, 4, 5, 6, 7, 8, 9, 10, 11, 12, 13, 14, 15, or 16 carbons, and having one or more carbon-carbon triple bonds. Alkynyl groups include, but are not limited to, ethynyl, propynyl, and butynyl. Alkynyl groups may be unsubstituted or substituted by one or more suitable substituents.

"Amide group" means a group of formula —C(O)NH$Y_1$ where $Y_1$ is selected from the group consisting of hydrogen, $C_1$-$C_{16}$ alkyl, aryl, arylalkyl, $C_2$-$C_{16}$ alkenyl, $C_2$-$C_{16}$ alkynyl, heteroaryl, alkylheteroaryl, or hydroxyl.

"Amino group" means a group of formula —NH$(Y)_2$ where each of $Y_2$ can be the same or different and each of Y is selected from the group consisting of hydrogen, $C_1$-$C_{16}$ alkyl, aryl, arylalkyl, $C_2$-$C_{16}$ alkenyl, $C_2$-$C_{16}$ alkynyl, heteroaryl, alkylheteroaryl, or hydroxyl.

"Amphoteric polymer" refers to a polymer derived from both cationic monomers and anionic monomers, and, possibly, other nonionic monomer(s). Representative amphoteric polymers include copolymers composed of terpolymers composed of acrylic acid, DADMAC and acrylamide, and the like.

"Aryl" refers to an unsubstituted or substituted aromatic carbocyclic substituent, as commonly understood in the art, and the term "$C_6$-$C_{10}$ aryl" includes phenyl and naphthyl. It is understood that the term aryl applies to cyclic substituents that are planar and comprise 4n+2n electrons, according to Hückel's Rule.

"Arylalkyl" means an aryl-alkylene group where aryl and alkylene are defined herein. Representative arylalkyl groups include benzyl, phenylethyl, phenylpropyl, 1-naphthylmethyl, and the like.

A method according to the claimed invention, wherein said method further comprises contacting said GPAM prepared according to any of the preceding claims combining with a fiber slurry or applying said GPAM to a paper sheet.

"Contacting" as used herein in the context of application of the GPAM product prepared according to the methods disclosed herein, refers to combining said GPAM with a fiber slurry, or applying said GPAM to a paper sheet.

"Chain transfer agent" means any molecule, used in free-radical polymerization, which will react with a polymer radical to form a dead polymer and a new radical. In particular, adding a chain transfer agent to a polymerizing mixture results in a chain-breaking and a concomitant decrease in the size of the polymerizing chain. Thus, adding a chain transfer agent limits the molecular weight of the polymer being prepared.

"Consisting essentially of" means that the methods and compositions may include additional steps, components, ingredients or the like, but only if the additional steps, components and/or ingredients do not materially alter the basic and novel characteristics of the claimed methods and compositions.

"Continuously measuring" as used herein refers to monitoring by the progress of the reaction of step (a) by measuring the viscosity of the reaction solution (e.g., via feedback loop) from an online viscosity meter. In some embodiments, continuous measurement of the progress of the reaction may be done in real time, optionally with feedback control.

"Cross-linking agent" or "branching agent" means a multifunctional monomer that when added to polymerizing monomer or monomers results in "branched" polymers or "cross-linked" polymers in which a branch or branches from one polymer molecule becomes attached to other polymer molecules.

"DADMAC" refers to monomeric units of diallyldimethylammonium halide such as diallyldimethylammonium chloride. DADMAC can be present in a homopolymer or in a copolymer comprising other monomeric units.

"Diallyl-N,N-disubstituted ammonium halide monomer" means a monomer of formula:

$$(H_2C{=}CHCH_2)_2N^+R_3R_4X^-$$

wherein $R_3$ and $R_4$ are independently $C_1$-$C_{20}$ alkyl, aryl or arylalkyl and X is an anionic counterion. Representative anionic counterions include halogen, sulfate, nitrate, phosphate, and the like. A preferred anionic counterion is halogen. Halogen is preferred. A preferred diallyl-N,N-disubstituted ammonium halide monomer is diallyldimethylammonium chloride.

"Halogen" or "halo" refers to a moiety selected from the group consisting of fluorine, chlorine, bromine, and iodine.

"GPAM" as used herein to refers to glyoxalated polyacrylamide, which is a polymer made from polymerized acrylamide monomers (which may or may not be a copolymer comprising one or more other monomers as well) and in which acrylamide polymeric units have been reacted with glyoxal groups, representative examples of GPAM are described in US Published Patent Application 2009/0165978. As used herein, the term "GPAM" encompasses a GPAM composition or mixture containing unreacted aldehyde (glyoxal). Furthermore, as used herein, the term "GPAM" encompasses an aqueous GPAM composition or mixture containing unreacted aldehyde (glyoxal). GPAM is used herein as an exemplary embodiment. The invention contemplates substituting other all AFPs, as defined herein, in place of GPAM.

"Monomer" means a polymerizable allylic, vinylic, or acrylic compound. The monomer may be anionic, cationic, nonionic, or zwitterionic.

Representative non-ionic, water-soluble monomers include acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-t-butylacrylamide, N-methylolacrylamide, vinyl acetate, vinyl alcohol, and the like.

Representative anionic monomers include acrylic acid, and it's salts, including, but not limited to sodium acrylate, and ammonium acrylate, methacrylic acid, and it's salts, including, but not limited to sodium methacrylate, and ammonium methacrylate, 2-acrylamido-2-methylpropanesulfonic acid (AMPS), the sodium salt of AMPS, sodium vinyl sulfonate, styrene sulfonate, maleic acid, and it's salts, including, but not limited to the sodium salt, and ammonium salt, sulfonate, itaconate, sulfopropyl acrylate or methacrylate or other water-soluble forms of these or other polymerisable carboxylic or sulphonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, itaconic anhydride, and the like.

Representative cationic monomers include allyl amine, vinyl amine, dialkylaminoalkyl acrylates and methacrylates and their quaternary or acid salts, including, but not limited to, dimethylaminoethyl acrylate methyl chloride quaternary salt (DMAEA.MCQ), dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride (DADMAC). Alkyl groups are generally $C_{14}$ alkyl.

The term "molecular weight" or "MW" as used herein refers to weight average molecular weight. Weight average molecular weight can be determined by any suitable technique. While alternate techniques are envisioned, in some embodiments, the weight average molecular weight is determined using size exclusion chromatography (SEC) equipped with a set of TSKgel PW columns (TSKgel Guard+GMPW+GMPW+G1000PW), Tosoh Bioscience LLC, Cincinnati, Ohio) and a Waters 2414 (Waters Corporation, Milford, Mass.) refractive index detector or a DAWN HELEOS II multi-angle light scattering (MALS) detector (Wyatt Technology, Santa Barbara, Calif). Moreover, the weight average molecular weight is determined from either calibration with polyethylene oxide/polyethylene glycol standards ranging from 150-875,000 Daltons or directly using light scattering data with known refractive index increment ("dn/dc").

The term "real time" as used herein refers to monitoring the pH of the crosslinking reaction while in progress. Measurement can be taken continuously or intermittently at periodic intervals.

The term "viscosity" as used herein refers to the internal friction or molecular attraction of a given material which manifests itself in resistance to flow. It is measured in liquids by standard test procedures and is usually expressed in poise or centipoise (cP) at a specified temperature. The viscosity of a fluid is an indication of a number of behavior patterns of the liquid at a given temperature including pumping characteristics, rate of flow, wetting properties, and a tendency or capacity to suspend an insoluble particulate material. As used herein, viscosity is based on measurement at ambient temperature and at about 6% to about 15% concentration solids of the reaction solution.

The term "viscosity meter" is used interchangeably herein with "viscometer".

The term "online viscometer" as herein refers to an open flow tube type viscometer and the like that (i) lack a spindle or probe and (ii) is not susceptible to complete blockage or fouling by gelling of an aldehyde functionalized polymer (such as GPAM) and (iii) which can provide continuous real time viscosity measurements via a feedback loop. As used herein, online viscosity meter includes viscometers such as concentric cylinder geometry (Couette type) viscometers which can provide viscosity measurements at defined shear conditions (i.e., a Couette viscometer, e.g. BROOKFIELD TT-100 Viscometer), vibration meters, viscometers based on a Coriolis mass flow measuring system (such as those where measuring is based on a torsional movement of a measurement tube, e.g., Endress+Hauser Proline 83I), etc. The online viscometer enables reliable reaction control and may facilitate automated quenching of the reaction mixture once a target viscosity level is reached.

"Zwitterionic monomer" means a polymerizable molecule containing cationic and anionic (charged) functionality in equal proportions, so that the molecule is net neutral overall.

Representative zwitterionic monomers include N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl) dimethylammonio]ethyl 2-methyl phosphate, 2-(acryloyloxyethyl)-2'-(trimethylammonium)ethyl phosphate, [(2-acryloylethyl)dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl) imidazolium hydroxide, (2-acryloxyethyl) carboxymethyl methylsulfonium chloride, 1-(3-sulfopropyl)-2-vinylpyridinium betaine, N-(4-sulfobutyl)-N-methyl-N, N-diallylamine ammonium betaine (MDABS), N,N-diallyl-N-methyl-N-(2-sulfoethyl)ammonium betaine, and the like.

"Papermaking process" means any portion of a method of making paper products from pulp comprising forming an aqueous cellulosic papermaking furnish, draining the furnish to form a sheet and drying the sheet. The steps of forming the papermaking furnish, draining and drying may be carried out in any conventional manner generally known to those skilled in the art. The papermaking process may also include a pulping stage, i.e. making pulp from a lignocellulosic raw material and bleaching stage, i.e. chemical treatment of the pulp for brightness improvement, papermaking is further described in the reference Handbook for Pulp and Paper Technologists, 3rd Edition, by Gary A. Smook, Angus Wilde Publications Inc., (2002) and The Nalco Water Handbook (3rd Edition), by Daniel Flynn, McGraw Hill (2009) in general and in particular pp. 32.1-32.44. "Papermaking process" includes methods of making paper products from pulp comprising forming an aqueous cellulosic papermaking furnish, draining the furnish to form a sheet and drying the sheet. The steps of forming the papermaking furnish, draining and drying may be carried out in any conventional manner generally known to those skilled in the art. Conventional microparticles, alum, cationic starch or a combination thereof may be utilized as adjuncts with the polymer treatment of this invention, though it must be emphasized that no adjunct is required for effective dewatering activity.

"Structural modifier" means an agent that is added to the aqueous polymer solution to control the polymer structure and solubility characteristics. The structural modifier is selected from the group consisting of cross-linking agents and chain transfer agents.

"Surface Strength" means the tendency of a paper substrate to resist damage due to abrasive force.

"Dry Strength" means the tendency of a paper substrate to resist damage due to shear force(s), it includes but is not limited to surface strength.

"Wet Strength" means the tendency of a paper substrate to resist damage due to shear force(s) when rewet.

"Wet Web Strength" means the tendency of a paper substrate to resist shear force(s) while the substrate is still wet.

"Substrate" means a mass containing paper fibers going through or having gone through a papermaking process, substrates include wet web, paper mat, slurry, paper sheet, and paper products.

"Paper Product" means the end product of a papermaking process it includes but is not limited to writing paper, printer paper, tissue paper, cardboard, paperboard, and packaging paper.

The term "initial viscosity" as used herein is obtained by measuring the viscosity of the reaction solution up to about 5 minutes after a polymer comprising at least one amide group or amino group is combined with aldehyde. The initial viscosity may be measured via feedback loop from an online viscosity meter or by other means. For example, the initial viscosity encompasses viscosity of the reaction solution up to 5 minutes after polyacrylamide is combined with glyoxal.

The term "target viscosity change" as used herein refers where the change in the viscosity of the reaction solution has reached an increase greater than 50% in viscosity over the initial viscosity of the reaction solution. In some embodiments, the target viscosity change occurs where the viscosity of the reaction solution has reached an increase greater than 100% in viscosity over the starting viscosity. The target viscosity change may occur when the viscosity of the reaction solution has reached an increase in viscosity of, about 50%, about 60%, about 70%, about 80%, about 90%, about 100%, about 200%, about 300%, about 400%, about 500%, about 100% to about 500%, about 200% to about 500%, or about 300% to about 500%, over the starting viscosity.

The term "shelf life" as used herein refers where the aldehyde-functionalized polymer has a viscosity less than 5000 cP for at least about 12 hours. In some embodiments, the aldehyde-functionalized polymer may have a viscosity less than 5000 cP for about 12 to about 48 hours. In further embodiments, the aldehyde-functionalized polymer may have a viscosity less than 5000 cP for about 12 to about 96 hours.

The term "reaction solution" as used herein refers to a reaction mixture formed after the combination of after a polymer comprising at least one amide group or amino group (such as polyacrylamide) is combined with aldehyde (e.g. glyoxal) in the preparation of AFPs, such as GPAM. The reaction solution may comprise moieties such as AFP (such as GPAM), unreacted aldehyde (such as glyoxal), unreacted polyacrylamide, intermediates in the formation of AFPs, etc. Furthermore, the reaction solution may also include unreacted acrylamide and unreacted ionic monomer.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims.

PREPARATION

Figure 1:
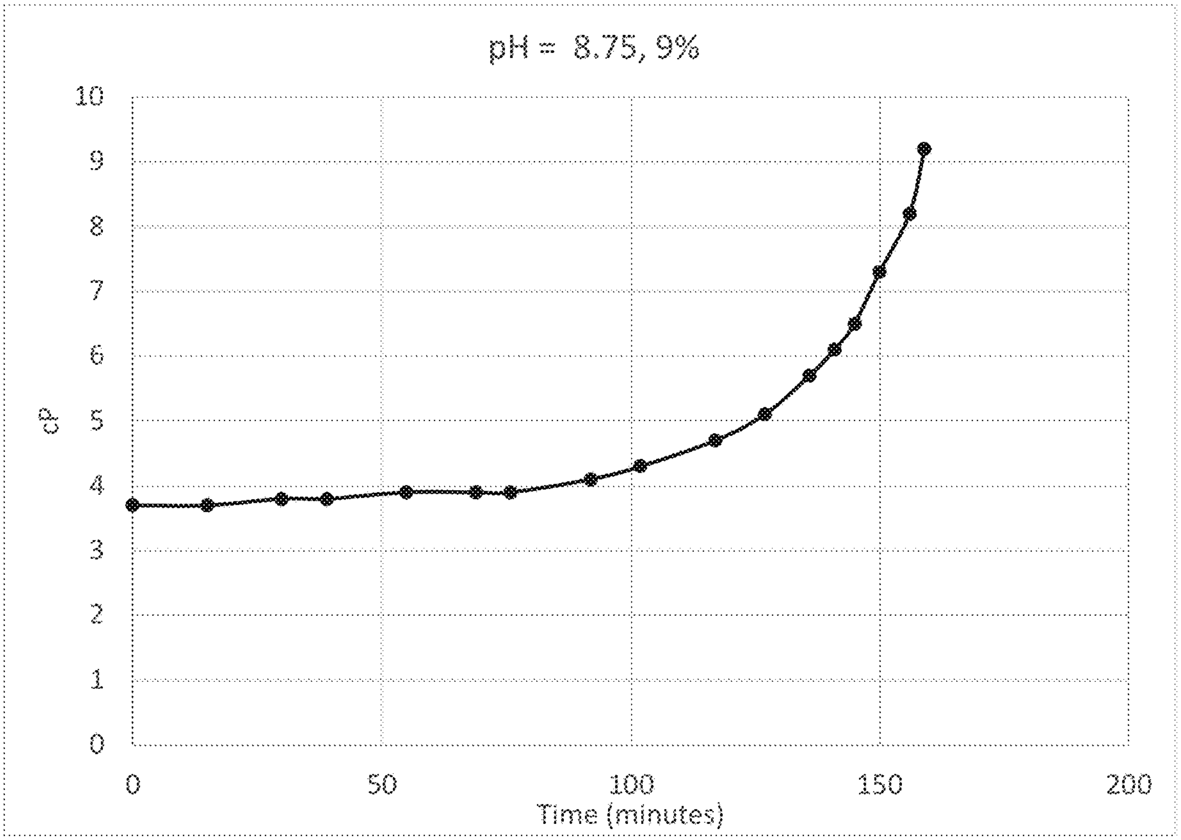
FIG. 1. Viscosity change over the course of the crosslinking reaction between polyacrylamide and glyoxal FIG. 2. Schematic representation of a GPAM generation process (exemplary embodiment).

One aspect of the invention pertains to a method of making GPAM, said method comprising:

(a) initiating a crosslinking reaction to generate GPAM by combining at least a polyacrylamide and glyoxal to obtain a reaction solution; and (b) quenching the reaction of step (a) by adjusting the pH of the reaction to a value in a range from about 2 to about 6 (or about 4 to about 6), once a target viscosity of the GPAM is met;

wherein the progress of GPAM formation is monitored by measuring the viscosity of the reaction solution via feedback loop from an online viscosity meter.

In some embodiments, step (a) comprises combining said polyacrylamide with water to obtain a mixture, and adding said glyoxal to the mixture to obtain said reaction solution.

In further embodiments, step (a) comprises combining said glyoxal with water to obtain a mixture and adding said polyacrylamide to the mixture of step (i) to obtain said reaction solution.

In some embodiments, step (a) comprises adjusting the temperature to between about 65-85 deg F. For example, the temperature may be adjusted between about 60-80 deg F., between about 70 to about 75 deg F., or to about 75 deg F.

In some embodiments, step (a) followed by step (b) may be repeated at least twice. For example, step (a) followed by step (b) may be repeated three times, four times, etc. The reaction vessel in which steps (a) and (b) are carried out may be cleaneded in between each cycle (i.e., step (a) followed by step (b).

In some embodiments, the adjustment of the pH in step (b) may be monitored in real time. This may be done by the use one pH meter, or in some instances 2 or more pH meters.

A further aspect of the invention pertains to a GPAM composition comprising GPAM prepared according to the method of preparing GPAM as disclosed herein, wherein said GPAM has a weight average molecular weight of from about 10,000 g/mole to 10,000,000 g/mole and wherein said GPAM has a glyoxal to acrylamide (G/A ratio) in the range of about 0.4 to about 1 to about 20 to about 1 or in the range of 0.4:1 to 20:1, or 0.4:1 or 0.8:1.

A further embodiment of the invention pertains to a GPAM composition prepared according to invention, wherein said GPAM has a weight average molecular weight of from about 10,000 g/mole to 10,000,000 g/mole; 10,000 g/mole to 7,000,000 g/mole; 10,000 g/mole to 5,000,000 g/mole; 3,000,000 g/mole to 4,000,000 g/mole; and 3,000,000 g/mole to 4,000,000 g/mole; wherein said GPAM has a glyoxal to acrylamide (G/A ratio) of about 0.4 to about 1 to about 20 to about 1.

A yet further aspect of the invention pertains to a method of generating aldehyde-functionalized polymer, said method comprising:

(a) initiating a crosslinking reaction to generate said aldehyde-functionalized polymer by combining at least a polymer comprising at least one amide group or amino group and an aldehyde to obtain a reaction solution; and (b) quenching the reaction of step (a) by adjusting the pH to a value in a range from about 4 to about 6, once the target viscosity of said aldehyde-functionalized polymer is met, wherein the progress of formation the aldehyde-functionalized polymer is monitored by measuring the viscosity of the reaction solution via feedback loop from an online viscosity meter.

A further embodiment of the invention pertains to an aldehyde-functionalized polymer composition is prepared according to invention, wherein said aldehyde-functionalized polymer has a weight average molecular weight of from about 10,000 g/mole to 10,000,000 g/mole; 10,000 g/mole to 7,000,000 g/mole; 10,000 g/mole to 5,000,000 g/mole; 1,000,000 g/mole to 4,000,000 g/mole; 3,000,000 g/mole to 4,000,000 g/mole; and 3,000,000 g/mole to 4,000,000 g/mole; wherein said aldehyde-functionalized polymer has an aldehyde to acrylamide (A/A ratio) of about 0.4 to about 1 to about 20 to about 1.

In a further embodiment, the method according to the present disclosure includes measuring the viscosity of the reaction mixture continuously in real time.

In a further embodiment, the method according to the present disclosure includes continuously monitoring the viscosity the reaction mixture with an on-line flow-through viscometer, wherein said viscometer does not require “grab sampling” or “spot checking”.

In some embodiments, the method according to the present disclosure includes continuously sending a viscosity value from an online viscometer to a feedback loop for in-line control of the pH of step (a) and/or (b).

In a further embodiment, the method according to the present disclosure includes continuously monitoring the reaction mixture with an in-line open flow-through type viscometer.

In some embodiments, the method according to the present disclosure includes continuously sending a viscosity value from a viscometer to a feedback loop for in-line control of the pH of step (a).

In a further embodiment, the method according to the present disclosure includes, prior to meeting the target viscosity, maintaining the pH of the reaction mixture in a range of from about 8 to about 9 by adding a caustic solution, and optionally further diluting the caustic solution with water.

In a further embodiment, the method according to the present disclosure includes adjusting quench the reaction of step (a) by adding an organic acid such as citric acid.

In a further embodiment, the method according to the present disclosure includes preparing GPAM at paper production site (i.e., "onsite") in a semi-batch, or a full batch.

In a further embodiment, the method according to the present disclosure includes adjusting automatically using inline pH control (via addition of acid) once the target viscosity of the aldehyde functionalized polymer (e.g., GPAM) is reached.

In a further embodiment, the method according to the present disclosure includes wherein the GPAM has a shelf-life in a range of from about 24 hours to about 2.5 months.

In a further embodiment, the method according to the present disclosure includes wherein steps (a) and/or (b) is conducted at a paper production site.

In some embodiments, said polyacrylamide is obtained by combining at least water, a copolymer of acrylamide and an ionic monomer. In a further embodiment, the method according to the present disclosure includes wherein the ionic monomer in the copolymer of acrylamide and an ionic monomer is a cationic, anionic or zwitterionic monomer.

Representative anionic monomers include acrylic acid, and its salts, including, but not limited to sodium acrylate, and ammonium acrylate, methacrylic acid, and its salts, including, but not limited to sodium methacrylate, and ammonium methacrylate, 2-acrylamido-2-methylpropanesulfonic acid, the sodium salt of AMPS, sodium vinyl sulfonate, styrene sulfonate, maleic acid, and its salts, including, but not limited to the sodium salt, and ammonium salt, sulfonate itaconate, sulfopropyl acrylate or methacrylate or other water-soluble forms of these or other polymerizable carboxylic or sulphonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, and the like.

Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethylaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminoethyl acrylate methyl chloride quaternary salt, dimethylaminoethyl acrylate benzyl chloride quaternary salt, dimethylaminoethyl methacrylate methyl chloride quaternary salt, dimethylaminoethyl methacrylate benzyl chloride quaternary salt, methacrylarnidopropyl trimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride, diallyldimethylammonium chloride, and the like.

Representative zwitterionic monomers include N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl) dimethylammonio]ethyl 2-methyl phosphate, 2-(acryloyloxyethyl)-2'-(trimethylammonium)ethyl phosphate, [(2-acryloylethyl)dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl) imidazolium hydroxide, (2-acryloxyethyl) carboxymethyl methylsulfonium chloride, 1-(3-sulfopropyl)-2-vinylpyridinium betaine, N-(4-sulfobutyl)-N-methyl-N, N-diallylamine ammonium betaine (MDABS), N,N-diallyl-N-methyl-N-(2-sulfoethyl)ammonium betaine, and the like.

In certain embodiments, the amino groups, amide groups, or combination of the amino and amide groups thereof are mono-reacted and di-reacted at a ratio of at least about 3 to 1 and GPAM has a weight average molecular weight of from about 10,000 g/mole to about 10,000,000 g/mole; from about 50,000 g/mole to about 5,000,000 g/mole; from about 100,000 g/mole to about 3,000,000 g/mole; from about 200,000 g/mole to about 1,000,000 g/mole; from about 300,000 g/mole to about 1,000,000 g/mole; from about 500,000 g/mole to about 1,000,000 g/mole.

In certain embodiments, the amino groups, amide groups, or combination of the amino and amide groups thereof are mono-reacted and di-reacted at a ratio of at least about 4 to 1 and the GPAM has a weight average molecular weight of from about 10,000 g/mole to about 10,000,000 g/mole; from about 50,000 g/mole to about 5,000,000 g/mole; from about 100,000 g/mole to about 3,000,000 g/mole; from about 200,000 g/mole to about 1,000,000 g/mole; from about 300,000 g/mole to about 1,000,000 g/mole; from about 500,000 g/mole to about 1,000,000 g/mole.

In certain embodiments, the GPAM prepared using the methods disclosed herein is a glyoxalated DADMAC/acrylamide polymer. In certain embodiments, acrylamide/DADMAC copolymer (e.g., 95/5 mole % acrylamide/DADMAC copolymer) may be used to prepare the GPAM of the invention. The 95/5 mole % acrylamide/DADMAC copolymer may be prepared according to the method described in US Patent Application Publication No. 2005/016118 (which is incorporated by reference to the extent to it disclosure does not conflict with the description herein) (see Example 1). U.S. Pat. Nos. 10,006,170, 8,894,817 are also incorporated by reference to the extent to their disclosure do not conflict with the description herein.

Mono-reacted amide or amine refers to a polymer formed when one glyoxal reacts with one amide or amine, and di-reacted amide or amine refers to a polymer formed when one glyoxal reacts with two amides or amines.

The aldehyde function polymers of the present disclosure (including GPAM) may comprise amino groups, amide groups, or both amino and amide groups substituted with an aldehyde in a mono-reacted to di-reacted amide ratio of at least about 1.5 to 1. Without wishing to be bound by any particular theory, it is believed that the mono-reacted aldehyde in the polymer is partially responsible for the observed enhancement of paper strength in the presence of the aldehyde-functionalized polymer. Thus, it is believed that the mono-reacted species (e.g., species having a free aldehyde) is responsible for the increased paper strength because, unlike the di-reacted species, the mono-reacted species can form a covalent bond with cellulose fiber.

In certain embodiments, the aldehyde-functionalized polymer (such as GPAM) of the invention comprises amino groups, amide groups, or a combination of amino and amide groups that are mono-reacted and di-reacted with aldehyde at a ratio of at least about 1.5 to 1. In certain embodiments, the GPAM comprises amino groups, amide groups, or a combination of amino and amide groups that are mono-reacted and di-reacted with glyoxal at a ratio of at least about 3 to 1. Thus, in certain embodiments, the GPAM of the invention comprises amino groups, amide groups, or both amino and amide groups that are mono-reacted and di-reacted with glyoxal at a ratio of at least about 3 to 1, at least about 3.5 to 1, at least about 4 to 1, at least about 4.5 to 1, at least about 5 to 1, at least about 5.5 to 1, or at least about 6 to 1. In certain embodiments, the GPAM comprises amino groups, amide groups, or a combination of amino and amide groups that are mono-reacted and di-reacted with glyoxal at a ratio of greater than about 3 to 1. In certain embodiments, the GPAM of the invention comprises amino groups, amide groups, or a combination of amino and amide groups that are mono-reacted and di-reacted with glyoxal at a ratio of at least about 3.5 to 1. In certain embodiments, the GPAM of the invention comprises amino groups, amide groups, or a combination of amino and amide groups that are mono-reacted and di-reacted with glyoxal at a ratio of at least about 4 to 1.

In certain embodiments, the GPAM of the invention comprises amino groups, amide groups, or a combination of amino and amide groups that are mono-reacted and di-reacted with glyoxal at a ratio of from about 3:1 to about 20:1. Thus, in certain embodiments, the GPAM of the invention comprises amino groups, amide groups, or a combination of amino and amide groups that are mono-reacted and di-reacted with glyoxal at a ratio of from about 3:1 to about 20:1, from about 3.5:1 to about 20:1, from about 4:1 to about 20:1, from about 4.5:1 to about 20:1, from about 5:1 to about 20:1, from about 5.5:1 to about 20:1, or from about 6:1 to about 20:1.

In certain embodiments, the composition comprises mono-reacted glyoxal and di-reacted glyoxal at a ratio of at least about 7 to 1, at least about 8 to 1, at least about 9 to 1, at least about 10 to 1, at least about 11 to 1, or at least about 12 to 1. In certain embodiments, the composition comprises mono-reacted glyoxal and di-reacted glyoxal at a ratio of from about 9:1 to about 50:1.

The GPAM of the invention may comprise any amount of amino groups, amide groups, and combinations that are mono-reacted. In certain embodiments, at least about 10 mole percent of the amino groups, amide groups, and combinations thereof are mono-reacted with at least one aldehyde. In certain embodiments, at least about 15 mole percent of the amino groups, amide groups, and combinations thereof are mono-reacted with at least one aldehyde. In certain embodiments, at least about 20 mole percent of the amino groups, amide groups, and combinations thereof are mono-reacted with at least one aldehyde.

In certain embodiments, the GPAM of the invention is formed by functionalizing an acrylamide copolymer comprising amino groups, amide groups, or a combination of amino and amide groups with one or more glyoxal wherein the glyoxal reacts with at least about 15 mole percent of the amino groups, amide groups, or combinations thereof. Thus, in certain embodiments, GPAM is formed by reacting at least a copolymer of acrylamide and an ionic monomer, which may comprise amino and/or amide groups with glyoxal wherein the glyoxal reacts with at least about 15 mole percent of the amino and/or amide groups, at least about 16 mole percent of the amino and/or amide groups, at least about 17 mole percent of the amino and/or amide groups, at least about 18 mole percent of the amino and/or amide groups, at least about 19 mole percent of the amino and/or amide groups, at least about 20 mole percent of the amino and/or amide groups, at least about 22 mole percent of the amino and/or amide groups, at least about 24 mole percent of the amino and/or amide groups, at least about 25 mole percent of the amino and/or amide groups, at least about 30 mole percent of the amino and/or amide groups, at least about 35 mole percent of the amino and/or amide groups, at least about 40 mole percent of the amino and/or amide groups, at least about 45 mole percent of the amino and/or amide groups, or at least about 50 mole percent of the amino and/or amide groups.

In certain embodiments, the method comprises combining at least a polyacrylamide and glyoxal to obtain a reaction solution; wherein the polyacrylamide has a weight average molecular weight of from about 7,000 g/mole to about 50,000 g/mole (about 10,000 g/mole to about 45,000 g/mole; about 15,000 g/mole to about 40,000 g/mole; about 20,000 g/mole to about 30,000 g/mole; about 7,000 g/mole to about 30,000 g/mole); and wherein said reaction is quenched when the viscosity of the reaction solution is in the range of about 12 cp to about 40 cP (about 15 cp to about 40 cP; about 18 cp to about 30 cP; about 20 cp to about 40 cP; about 25 cp to about 40 cP; about 12 cp to about 30 cP).

In certain embodiments, the method comprises combining at least a polyacrylamide and glyoxal to obtain a reaction solution; wherein the polyacrylamide has a weight average molecular weight of from about 50,000 g/mole to about 200,000 g/mole (about 50,000 g/mole to about 150,000 g/mole; about 75,000 g/mole to about 200,000 g/mole; about 80,000 g/mole to about 180,000 g/mole; about 100,000 g/mole to about 200,000 g/mole); and wherein said reaction is quenched when the viscosity of the reaction solution is in the range of about 20 cp to about 1000 cP (about 50 cp to about 500 cP; about 100 cp to about 800 cP; about 150 cp to about 600 cP; about 75 cp to about 400 cP; about 200 cp to about 500 cP).

In certain embodiments, the GPAM of the invention has a weight average molecular weight of from about 10,000 g/mole to about 10,00,000 g/mole, from about 10,000 g/mole to about 7,000,000 g/mole, from about 10,000 g/mole to about 5,000,000 g/mole, 1,000,000 g/mole to about 10,000,000 g/mole, from about 1,000,000 g/mole to about 5,000,000 g/mole from about 3,000,000 g/mole to about 4,000,000 g/mole, or from about 3,000,000 g/mole to about 5,000,000 g/mole.

In certain embodiments, the polymerization and/or post polymerization reaction conditions are selected such that the resulting polymer comprising amino and/or amide groups has a molecular weight of from about 1,000 g/mole to about 10,000,000 g/mole.

Figure 2:
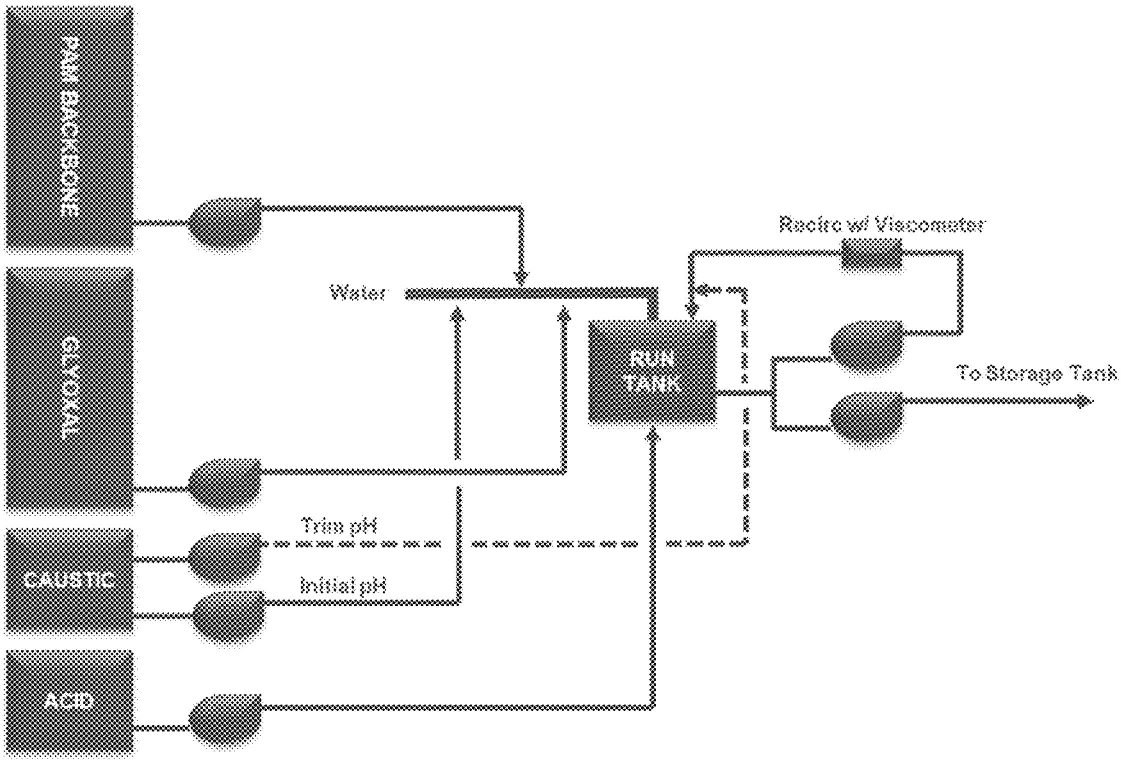

In some embodiments, GPAM may be prepared using manufacturing process as outlined in FIG. 2. One aspect of the invention pertains to a method of generating GPAM comprising:

(a) combining (e.g., via pumping) at least water, a copolymer of acrylamide and an ionic monomer ("PAM backbone")(such as acrylamide/DADMAC), and glyoxal in a reaction vessel (such as a tank) to obtain a reaction mixture;
(b) maintaining a desired concentration of the mixture of step (a);
(c) optionally recirculating the reaction mixture;
(d) continuously monitoring viscosity of the reaction mixture in real time; and
(e) once a target viscosity is met, adjusting the pH of the reaction mixture (e.g. by addition of citric acid) to a value in a range from about 4 to about 6, to obtain GPAM.

During the reaction, pH may be maintained between about 8 to about 9 by relying on a caustic pump running in tandem with dilution water using in-line pH control. When the desired viscosity is met, the reaction is quenched, and an acid pump (such as a citric acid pump) is started and the pH of the resulting solution is lowered to a range of from about 4 to about 6, depending on the level of shelf-life needed.

In FIG. 2, process input materials include water, a PAM backbone material (e.g., a copolymer of acrylamide and an ionic monomer), glyoxal, and pH adjustment solutions including an aqueous solution of a caustic material (e.g., NaOH) and an aqueous solution of an acid. The input materials are pumped into a run tank according to a control system. A feedback loop includes a pump for recirculation of the tank contents through an in-line viscometer. Feedback readings from the viscometer are used for measuring reaction progress. During reaction of the PAM backbone material with glyoxal the pH is maintained in a range of from about 8 to about 9. When the viscosity reading reaches a pre-determined level, the reaction is quenched by addition of acid, and then pumped to a storage tank.

Viscometer

It is particularly advantageous to monitor the viscosity continuously and in real time, to enable a feedback control system for the reaction. The reaction time of the method disclosed herein can be controlled by adjusting the pH level, and the adjustment of pH can be brought under automation control by including the continuous real time measurement of the viscosity of the reaction mixture. Of the various viscometers available, some are more suitable than others for continuous real time measurement of viscosity. Viscometers with spindle arrangement are not suitable (for example, a BROOKFIELD LV series viscometer, with UL adapter—see U.S. Pat. No. 8,920,606; see also, U.S. Patent Publication No. 2005/0161181). On the other hand, "open flow through type" in-line viscometers are better alternatives, e.g., viscometers that operate based concentric cylinder geometry (Couette type) providing viscosity measurements at defined shear conditions (i.e., Couette viscometers), such a Brookfield TT-100 Viscometer (found at e.g., https://www.brookfieldengineering.com/products/viscometers/in-line-process-viscometers/tt-100-viscometer), which may be used for monitoring the progress of formation of aldehyde functionalized polymer (e.g., GPAM) in step (a). Additionally, viscometers operating with an open flow tube such as Proline Promass 83I (E+H) may be suitable for monitoring the progress of formation of aldehyde functionalized polymer (e.g., GPAM) in step (a).

Figure 3:
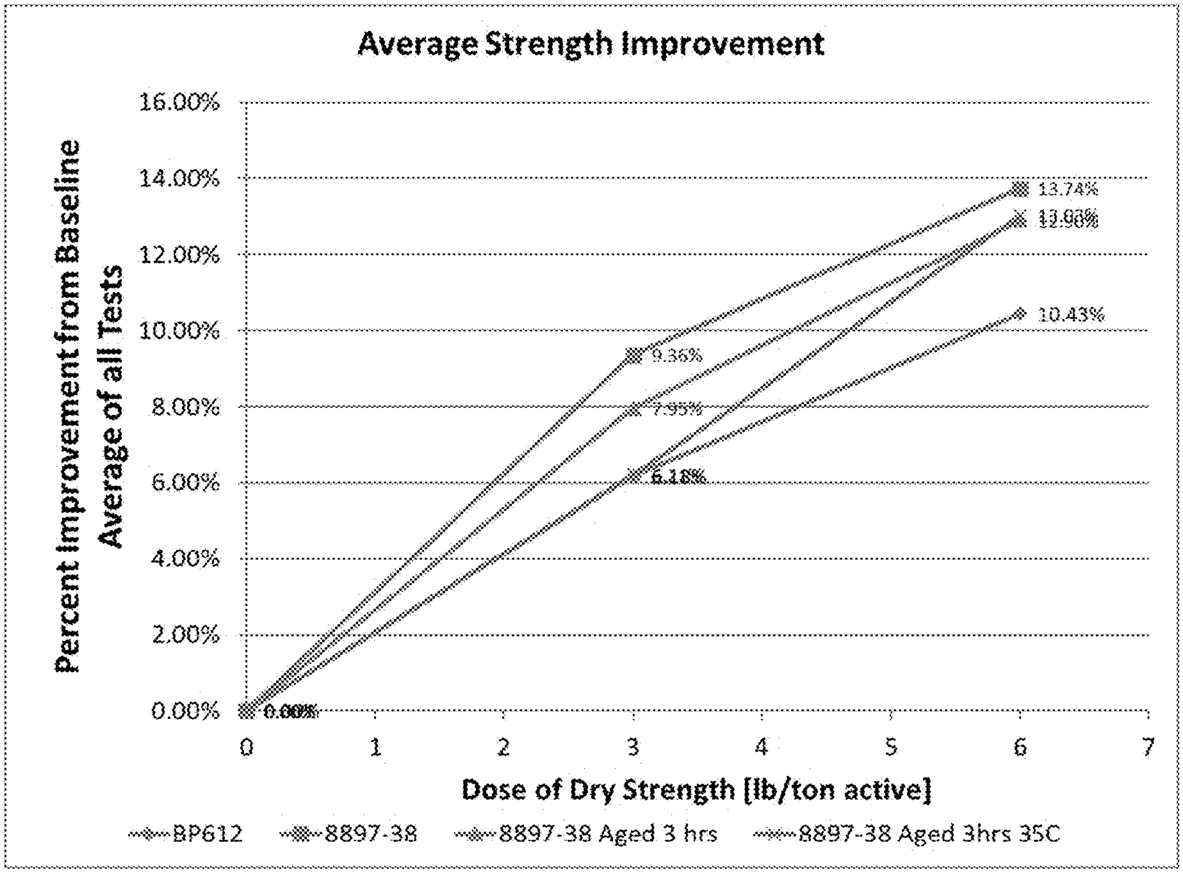
FIG. 3. is a chart of strength test improvement of GPAM samples generated according to the method of the present disclosure.
Figure 4:
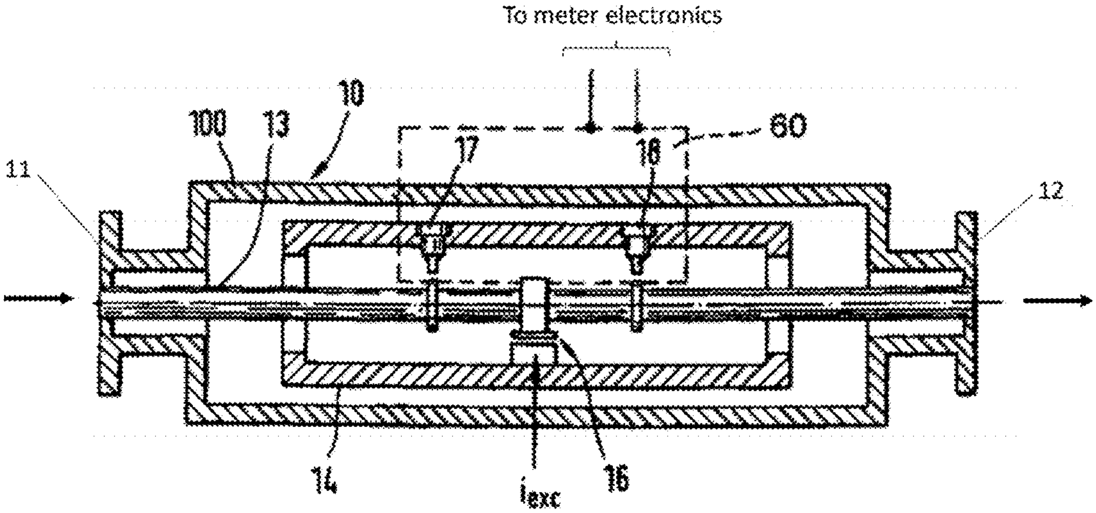
FIG. 4. An exemplary embodiment of an online viscometer.

Another type of viscometer that may be used for monitoring the progress of formation of aldehyde functionalized polymer (e.g., GPAM) in step (a). is a "vibration meter", which measures vibrational flexing of a flow tube under electromechanical excitation. An example of such a vibration meter is described in U.S. Pat. No. 7,520,162, see e.g., columns 6-9, the disclosure of which is hereby incorporated by reference. FIG. 3 shows a simplified schematic of a cross-sectional view of a transducer assembly 10 of the vibration meter. Transducer assembly 10 comprises a straight, flexible flow tube 13, which has an inlet end 11, an outlet end 12, and an elastically deformable lumen on an inner face of flow tube 13. Transducer assembly 10 also includes a rigid support frame 14, which is enclosed by a housing 100 and in which flow tube 13 is clamped so as to be capable of vibratory motion. "Elastic deformation" of the lumen as used herein means that a three-dimensional shape and/or a spatial position of the fluid-conducting lumen is changed in a cyclic manner, particularly periodically, within an elasticity range of flow tube 13. The elastic deformation is produced by reaction to forces describing the fluid, namely Coriolis forces, mass inertial forces, and/or shearing forces, during operation of transducer assembly 10.

Measurement of the oscillation modes of flow tube 13 can be analyzed using the meter electronics module, which includes an evaluating circuit which estimates signals from electrodynamic sensors 17 and 18 and from the excitation current $i_{exc}$ a damping of oscillations of flow tube 13 and which derives a viscosity value representative of the viscosity of the fluid based on said damping being estimated. Additional detail for the functioning of the meter electronics module is described in U.S. Pat. No. 7,520,162, see e.g., columns 6-9.

Materials especially suited for flow tube 13 are titanium alloys, for example. It is also possible to use other materials commonly employed for such flow tubes, particularly for bent tubes, such as stainless steel or zirconium. Transducer assembly 10 further comprises an electromechanical excitation arrangement 16, which is activated by excitation current $i_{exc}$ to spatially deflect flow tube 13 from a static position of rest during operation, elastically deforming flow tube 13 with lateral and torsional movement. A sensor arrangement 60 includes velocity-measuring electrodynamic sensors 17 and 18, which serve to sense movements of flow tube 13 as it flexes. Sensor arrangement 60 is connected to a meter electronics module (not shown), for recording and analysis of signals from the sensors, and for delivery of excitation current $i_{exc}$ to excitation arrangement 16.

In some embodiments, said online viscosity meter comprises:

(a) a transducer assembly comprising:
  (i) at least one flow tube being inserted into a pipe, said flow tube having a lumen conducting the aldehyde functionalized polymer (e.g., GPAM) of the invention and said flow tube being clamped at an inlet end and an outlet end so as to be capable of vibrating;
  (ii) an electromechanical excitation arrangement, said excitation arrangement driving said flow tube to oscillate in a bending mode at least partially for producing viscous friction within the fluid; and
  (iii) a sensor arrangement, responsive to oscillations of the flow tube, for generating at least one sensor signal, representative of lateral deflections of the flow tube; and
(b) meter electronics comprising:
  (i) an excitation circuit which generates an excitation current feeding the excitation arrangement; and
  (ii) an evaluating circuit which estimates from said at least one sensor signal and from the excitation current a damping of oscillations of said flow tube and which derives a viscosity value representative of the viscosity of said aldehyde functionalized polymer of the invention based on said damping being estimated.

In certain embodiments, said online viscosity meter comprises:

(a) a transducer assembly comprising:
  (i) at least one flow tube being inserted into the pipe, said flow tube having a lumen conducting the GPAM and said flow tube being clamped at an inlet end and an outlet end so as to be capable of vibrating;
  (ii) an electromechanical excitation arrangement, said excitation arrangement driving said flow tube to oscillate in a bending mode at least partially for producing viscous friction within the fluid; and
  (iii) a sensor arrangement, responsive to oscillations of the flow tube, for generating at least one sensor signal, representative of lateral deflections of the flow tube; and
(b) meter electronics comprising:
  (i) an excitation circuit which generates an excitation current feeding the excitation arrangement; and
  (ii) an evaluating circuit which estimates from said at least one sensor signal and from the excitation current a damping of oscillations of said flow tube and which derives a viscosity value representative of the viscosity of said GPAM of the invention based on said damping being estimated.

Advantageously, there are no parts or protrusions within the flow tube 13 to become fouled with GPAM, should it begin to gel, for example. A recirculating pump can be used for pumping a flow of the GPAM through flow tube 13, enabling continuous real-time measurement of viscosity In some embodiments, a viscometer including the transducer assembly of FIG. 3 is connected in-line with a pipe through which a reaction mixture is continuously pumped, enabling measuring the viscosity of the reaction mixture continuously in real time. Such a configuration of an in-line flow-through viscometer enables continuously sampling of the reaction mixture.

In some embodiments, the online viscometer used for the invention may be one that relies on a Coriolis effect and measures oscillating deflections of one or more bent flow tubes is described in U.S. Published Patent Application No. 2020/0166444, which is incorporated herein by reference. In some embodiments, a Coriolis mass flow measuring system (such as those where measuring is based on a torsional movement of a measurement tube) may be used to control reaction time by monitoring the viscosity of GPAM formed. For example, the viscometer that may be used in preparation of GPAM according to the invention may comprise:

a measuring system having at least one measuring tube, which in measurement operation is filled with a fluid (i.e., GPAM) or through which GPAM is flowing, and which has at least one tube section excitable to execute oscillations, an exciter system for exciting at least two wanted oscillation modes of different frequencies, at each of which at least one of the tube sections is excited to execute oscillations, especially resonant oscillations, a sensing system, which is embodied in such a manner that it determines for the wanted oscillation modes excited in measurement operation, in each case, a frequency and a damping, especially a frequency, an amplitude and a damping, of a resulting oscillation of at least one tube section excited to execute oscillations of one of the wanted oscillation modes, and an evaluation system, which is embodied in such a manner that it determines, based on calibration data stored in a memory for the individual wanted oscillation modes excited in measurement operation, in each case, based on an excitation determined frequency and damping, especially frequency, amplitude and damping, of the resulting oscillation a shear rate value and a viscosity measured value, wherein the viscosity measured value corresponds to the dynamic viscosity of the GPAM at a static shear rate corresponding to the shear rate value.

Application

A further aspect of the invention pertains to a method for enhancing paper strength and press section dewatering of a paper sheet on a paper machine comprising adding to the paper sheet about 0.05 lb/ton to about 20 lb/ton, based on dry fiber, an aqueous composition prepared according to a method of preparing GPAM disclosed herein, and combining said GPAM with a fiber slurry, or applying said GPAM to a paper sheet. In some embodiments, said GPAM has a weight average molecular weight of from about 10,000 g/mole to 10,000,000 g/mole. In further embodiments, said aldehyde-functionalized polymer (such as GPAM) has a glyoxal to acrylamide (G/A ratio) of about 0.4 to about 1 to about 20 to about 1, or 0.4:1 to 20:1, or 0.4:1, or 0.8:1.

Another aspect of the invention pertains to a method for enhancing paper strength and press section dewatering of a paper sheet on a paper machine comprising adding to the paper sheet about 0.05 lb/ton to about 20 lb/ton, based on dry fiber, an aqueous composition prepared by a method comprising:

(a) initiating a crosslinking reaction to generate GPAM by combining at least a polyacrylamide and glyoxal to obtain a reaction solution;
(b) quenching the reaction by adjusting the pH of the reaction of step (a) to a value in a range from about 2 to about 6 (or about 4 to about 6), once a target viscosity of the GPAM is met; wherein the progress of GPAM formation is monitored by measuring the viscosity of the reaction solution via feedback loop from an online viscosity meter; and
(c) combining said GPAM of step (b) with a fiber slurry or applying said GPAM to a paper sheet.

In certain embodiments, the present disclosure provides a method for generating an aldehyde-functionalized polymer (such as GPAM) composition for treating the strength and press section dewatering of a paper sheet. The composition comprises one or more aldehyde-functionalized polymers (such as GPAM) prepared according to the method. In some embodiments, said GPAM has a weight average molecular weight of from about 10,000 g/mole to 10,000,000 g/mole. In further embodiments, said aldehyde-functionalized polymer (such as GPAM) has a glyoxal to acrylamide (G/A ratio) of about 0.4 to about 1 to about 20 to about 1, or 0.4:1 to 20:1, or 0.4:1, or 0.8:1.

In another embodiment, the present disclosure provides a method for enhancing the strength and press section dewatering of a paper sheet on a paper machine. The method comprises adding to the paper sheet about 0.05 lb/ton to about 20 lb/ton, based on dry fiber, of a composition comprising GPAM comprising amino groups, amide groups, or a combination of amino and amide groups thereof, wherein (i) at least about 15 mole percent of the amino groups, amide groups, or both the amino or amide groups are functionalized with glyoxal, (ii) the amino groups, amide groups, or both the amino or amide groups are mono-reacted and di-reacted at a ratio of at least about 1.5 to 1, and (iii) the GPAM has a weight average molecular weight of from about 10,000 g/mole to about 10,000,000 g/mole.

The amount of GPAM added to the paper sheet is not limited. In certain embodiments, a composition comprising one or more aldehyde-functionalized polymers is added to the paper sheet in from about 0.05 lb/ton to about 20 lb/ton, based on dry fiber. Thus in certain embodiments, a composition comprising GPAM is added to the paper sheet in from about 0.05 lb/ton to about 20 lb/ton, from about 0.05 lb/ton to about 18 lb/ton, from about 0.05 lb/ton to about 15 lb/ton, from about 0.05 lb/ton to about 12 lb/ton, from about 0.05 lb/ton to about 10 lb/ton, from about 0.05 lb/ton to about 8 lb/ton, from about 0.05 lb/ton to about 6 lb/ton, from about 0.05 lb/ton to about 4 lb/ton, from about 0.05 lb/ton to about 3 lb/ton, from about 0.15 lb/ton to about 2 lb/ton, from about 1 lb/ton to about 20 lb/ton, from about 1 lb/ton to about 18 lb/ton, from about 1 lb/ton to about 15 lb/ton, from about 2 lb/ton to about 20 lb/ton, from about 2 lb/ton to about 18 lb/ton, from about 2 lb/ton to about 15 lb/ton, from about 5 lb/ton to about 15 lb/ton, from about 1 lb/ton to 10 about 10 lb/ton, from about 1 lb/ton to about 5 lb/ton, or from about 5 lb/ton to about 10 lb/ton. In certain embodiments, a composition comprising GPAM is added to the paper sheet in from about 0.05 lb/ton to about 3 lb/ton.

The GPAM of the invention may be added to the papermaking system in any form, such as a solution comprising unreacted aldehyde (glyoxal). The solution comprising GPAM may comprise unreacted aldehyde (glyoxal) in any suitable amount. In certain embodiments, the solution comprising GPAM of the invention comprises unreacted glyoxal in an amount from about 40% to about 95%, from about 40% to about 90%, from about 40% to about 85%, from about 40% to about 80%, from about 40% to about 75%, from about 40% to about 70%, from about 40% to about 65%, from about 40% to about 60%, from about 45% to about 95%, from about 50% to about 95%, from about 55% to about 95%, from about 60% to about 95%, from about 65% to about 95%, from about 70% to about 95%, from about 75% to about 95%, or from about 80% to about 95%. In certain embodiments, the solution comprising GPAM comprises unreacted glyoxal in an amount from about 60% to about 95%.

In certain embodiments, the present disclosure provides a paper sheet produced according to one of the aforementioned methods.

In certain embodiments, GPAM is added to a papermaking system as an aqueous solution. In certain embodiments, GPAM is added to a papermaking system as a solution in a co-solvent miscible with water. In certain embodiments, the GPAM is sprayed onto the paper sheet prior to press dewatering.

The composition and method of the present disclosure may be used in any papermaking process, including in a method of making paper products from pulp comprising forming an aqueous cellulosic papermaking furnish, draining the furnish to form a sheet and drying the sheet. The steps of forming the papermaking furnish, draining and drying may be carried out in any conventional manner generally known to those skilled in the art. Conventional microparticles, alum, cationic starch or a combination thereof may be utilized as adjuncts with the polymer treatment of the present disclosure, though it must be emphasized that no adjunct is required for effective dewatering activity.

The GPAM of the present disclosure may be added in traditional wet end locations used for conventional wet end additives. These include thin stock or thick stock. The actual wet end location is not considered to be critical. Because GPAM are believed to act as pressing aids, their addition to the wet end is not necessary, and the option of adding them just prior to the press section after the formation of the sheet can also be practiced. For example, the GPAM can be sprayed (e.g., using a shower bar) on the wet web prior to entering the press section, and this may be a preferred mode of addition to reduce dosages or the effects of interferences which might occur in the wet end. Other traditional wet end additives can be used in combination with the aldehyde functionalized polymers. These include retention aids, strength additives such as starches, sizing agents, and the like.

When using GPAM as described herein having net anionic charge, a method of fixing the polymer to the fiber may be needed. This fixing may be accomplished by using cationic materials in conjunction with the polymer. Such cationic materials may include coagulants, either inorganic (e.g. alum, polyaluminum chlorides, iron chloride or sulfate, and any other cationic hydrolyzing salt) or organic (e.g. p-DADMACs, EPI/DMAs, PEIs, modified PEIs or any other high charged density low to medium molecular weight polymers). Additionally, cationic materials added for other purposes like starch, wet strength, or retention additives may also serve to fix the anionic polymer. No additional additives are generally needed to fix cationic aldehyde-functionalized polymers to the filler.

The GPAM may be used for dewatering all grades of paper and paperboard. In certain embodiments, the GPAM are used to prepare recycle board grades using OCC (old corrugated containers), with or without mixed waste. In certain other embodiments, the GPAM is used to prepare virgin, recycled, mechanical, chemical, bleached, or unbleached paper.

In certain embodiments, a composition comprising GPAM further comprises a cationic starch.

EMBODIMENTS

A non-limiting list of embodiments is provided below:

1. A method of making GPAM, said method comprising:
   (a) combining at least a polyacrylamide and glyoxal to obtain a reaction solution; and
   (b) quenching the reaction by adjusting the pH of the reaction solution to a value in a range from about 2 to about 6 to obtain said GPAM;
   wherein progress of the reaction is monitored by measuring the viscosity of the reaction solution from an online viscosity meter.
2. The method of embodiment 1, wherein said GPAM has a weight average molecular weight of from about 10,000 g/mole to 10,000,000 g/mole.
3. The method of any of the preceding embodiments, wherein said GPAM has a glyoxal to acrylamide (G/A ratio) of about 0.05:1 to about 20:1, or 0.1:1 to about 20:1.
4. The method of embodiment 1, wherein the progress of said reaction is monitored by continuously measuring the viscosity of said reaction solution, optionally with feedback control.
5. The method of any of the preceding embodiments, wherein the online viscosity meter comprises:
   (a) a transducer assembly comprising:
   (i) at least one flow tube inserted into a pipe, said flow tube having a lumen conducting the reaction solution and said flow tube being clamped at an inlet end and an outlet end so as to be capable of vibrating;
   (ii) an electromechanical excitation arrangement; and
   (iii) a sensor arrangement; and
   (b) meter electronics.

6. The method of any of the preceding embodiments, wherein the reaction is quenched when the viscosity of the reaction solution compared to its initial viscosity has increased more than 100%.
7. The method of any of the preceding embodiments, wherein the pH of the reaction in step (a) is maintained in a range of from about 8 to about 9 by adding a caustic solution (wherein said caustic solution is optionally further diluted with water).
8. The method of any of the preceding embodiments, wherein in step (b) said quenching comprises adding an organic acid (such as citric acid).
9. The method of any of the preceding embodiments, wherein said GPAM has a glyoxal to acrylamide (G/A ratio) of in the range of about 0.4:1 to about 20:1.
10. The method of any of the preceding embodiments, wherein at least one of steps (a) to (b) is conducted at a paper production site.
11. The method of any of the preceding embodiments, wherein the GPAM is prepared onsite in a semi-batch or a full batch.
12. The method of any of the preceding embodiments, wherein said method is performed as a batch or semi-batch process.
13. The method of any of the preceding embodiments, wherein said polyacrylamide is a copolymer of acrylamide/DADMAC.
14. The method of embodiment 13, wherein said copolymer is about 1-30 mole % DADMAC and about 70-99 mole % acrylamide.
15. The method of embodiment 1, wherein said viscometer is an open flow tube viscometer.
16. The method of embodiment 1, wherein said viscosity meter comprises a measuring system having at least one measuring tube, which in measurement operation is filled with the reaction solution, or through which the reaction solution is flowing, and which has at least one tube section excitable to execute oscillations, an exciter system for exciting at least two wanted oscillation modes of different frequencies, at each of which at least one of the tube sections is excited to execute oscillations, especially resonant oscillations, a sensing system, which is embodied in such a manner that it determines for the wanted oscillation modes excited in measurement operation, in each case, a frequency and a damping, especially a frequency, an amplitude and a damping, of a resulting oscillation of at least one tube section excited to execute oscillations of one of the wanted oscillation modes, and an evaluation system, which is embodied in such a manner that it determines, based on calibration data stored in a memory for the individual wanted oscillation modes excited in measurement operation, in each case, based on an excitation determined frequency and damping, especially frequency, amplitude and damping, of the resulting oscillation a shear rate value and a viscosity measured value, wherein the viscosity measured value corresponds to the dynamic viscosity of the GPAM at a static shear rate corresponding to the shear rate value.

17. A method for enhancing paper strength and press section dewatering of a paper sheet on a paper machine comprising adding to the paper sheet about 0.05 lb/ton to about 20 lb/ton, based on dry fiber, of an aqueous composition prepared by a method according to any of the preceding embodiments.
18. A method of generating aldehyde-functionalized polymer, said method comprising:
    (a) combining at least a polymer comprising at least one amide group or amino group and an aldehyde to obtain a reaction solution; and
    (b) quenching the reaction by adjusting the pH of the reaction solution to a value in a range from about 2 to about 6 (or about 4 to about 6) to obtain said aldehyde-functionalized polymer;

wherein progress of the reaction is monitored by measuring the viscosity of the reaction solution from an online viscosity meter.

19. The method of embodiment 18, wherein said aldehyde is chosen from formaldehyde, paraformaldehyde, and glutaraldehyde.
20. A method according to embodiment 18, wherein said method further comprises contacting said GPAM prepared according to any of the preceding embodiments with a fiber slurry, or with a paper sheet.
21. A paper sheet produced according to the method of embodiment 17 or embodiment 20.
22. A method for enhancing paper strength and press section dewatering of a paper sheet on a paper machine comprising adding to the paper sheet about 0.05 lb/ton to about 20 lb/ton, based on dry fiber, of an aqueous composition prepared by a method according to embodiment 18 or embodiment 19.
23. A method according to embodiment 18, wherein said method further comprises contacting said GPAM with a fiber slurry or with a paper sheet.
24. A paper sheet produced according to the method of embodiments 22 or 23.
25. The method of any of the preceding embodiments, wherein progress of making GPAM is monitored by measuring the viscosity of the reaction solution via feedback loop from an online viscosity meter.
26. The method of any of the preceding embodiments, wherein the reaction is quenched when the viscosity of the reaction solution is at least 3 cP.
27. The method of any of the preceding embodiments, wherein the reaction is quenched when the viscosity of the reaction solution is in a range of about 20 cP to about 1,000 cP.
28. A GPAM composition comprising GPAM prepared according to a method of any of the preceding embodiments, wherein said GPAM has a weight average molecular weight of from about 10,000 g/mole to 10,000,000 g/mole and wherein said GPAM has a glyoxal to acrylamide (G/A ratio) in the range of about 0.4:1 to about 20:1.
29. A method of making GPAM, said method comprising:
    (a) combining at least a polyacrylamide and glyoxal to obtain a reaction solution; and
    (b) quenching the reaction by adjusting the pH of the reaction solution to a value in a range from about 2 to about 6 (or about 4 to about 6) to obtain said GPAM;

wherein the progress of the reaction is monitored by measuring the viscosity of the reaction solution via feedback loop from an online viscosity meter;

wherein said polyacrylamide has a weight average molecular weight of about 7,000-50,000 Daltons;

wherein said reaction is quenched when the reaction solution is a viscosity in the range of about 12 cp to about 40 cP.

30. A method of making GPAM, said method comprising:
    (a) combining at least a polyacrylamide and glyoxal to obtain a reaction solution; and (b) quenching the reaction by adjusting the pH of the reaction solution to a value in a range from about 2 to about 6 (or about 4 to about 6) to obtain said GPAM;

wherein the progress of the reaction is monitored by measuring the viscosity of the reaction solution via feedback loop from an online viscosity meter;

wherein said polyacrylamide has a weight average molecular weight of about 50,000-200,000 Daltons;

wherein said reaction is quenched when the reaction solution is a viscosity in the range of about 20 cP to about 1,000 cP (where the measurement of viscosity is based on measurement at ambient temperature and where the reaction solution has a concentration of 8-10% concentration/solids).

31. A method of making GPAM, said method comprising:

(a) combining at least a polyacrylamide and glyoxal to obtain a reaction solution; and (b) quenching the reaction by adjusting the pH of the reaction solution to a value in a range from about 2 to about 6 (or about 4 to about 6) to obtain said GPAM;

wherein the progress of the reaction is monitored by measuring the viscosity of the reaction solution via feedback loop from an online viscosity meter;

wherein said polyacrylamide has a weight average molecular weight of about 15,000 Daltons;

wherein said reaction is quenched when the reaction solution is a viscosity in the range of about 10 cP to about 100 cP (where the measurement of viscosity is based on measurement at ambient temperature and where the reaction solution has a concentration of 6-15% concentration/solids).

32. The method of embodiment 1, wherein said polyacrylamide has a weight average molecular weight of 7,000-50,000 Daltons; and wherein said reaction is quenched at a viscosity in the range of about 10 cp to about 40 cP.

33. The method of embodiment 1, wherein said polyacrylamide has a weight average molecular weight of 50,000-200,000 Daltons; and wherein said reaction is quenched at a viscosity in the range of about 20 cP to about 1,000 cP.

34. The method of embodiment 1, wherein said polyacrylamide has a weight average molecular weight of 15,000—about 20,000 Daltons; wherein the reaction solution has an initial viscosity of about 2-4 cP; and wherein said reaction is quenched at a viscosity in the range of about 10-15 cP.

35. The method of embodiment 1, wherein said polyacrylamide has a weight average molecular weight of 30,000—about 50,000 Daltons; wherein the reaction solution has an initial viscosity of about 5-8 cP and wherein said reaction is quenched at a viscosity in the range of about 25 cp to about 40 cP (or 30 cp to about 40 cP).

36. The method of embodiment 1, wherein said reaction solution has an initial viscosity of about 2-10 cP.

37. The method of embodiments 1, 18, or 29-31, wherein the reaction is quenched when the viscosity of the reaction solution compared to its initial viscosity has increased more than 100%.

38. The method of embodiments 1, 18, or 29-31, wherein the reaction of step (a) is quenched when the viscosity of the reaction solution compared to its initial viscosity has increased 300-400%.

39. The method of embodiments 1, 18, or 29-31, wherein the reaction of step (a) is quenched when the viscosity of the reaction solution compared to its initial viscosity has increased 300-400%.

40. The method of embodiments 1, 18, or 29-31, wherein the reaction of step (a) is quenched when the viscosity of the reaction solution compared to its initial viscosity has increased by at least 50%.

41. The method of embodiments 1, 18, or 29-31, wherein the reaction of step (a) is quenched when the viscosity of the reaction solution compared to its initial viscosity has increased by at least 100%.

42. The method of embodiments 1, 18, or 29-31, wherein the reaction of step (a) is quenched when the viscosity of the reaction solution compared to its initial viscosity has increased about 300 to about 500%.

43. The method of embodiments 1, 18, or 29-31, wherein the reaction of step (a) is quenched when the viscosity of the reaction solution compared to its initial viscosity has increased about 300 to about 400%.

44. The method of embodiments 1, 18, or 29-31, wherein the reaction of step (a) is quenched when the viscosity of the reaction solution compared to its initial viscosity has increased about 400%.

45. The method of embodiments 1, 18, or 29-31, wherein the reaction of step (a) is quenched when the viscosity of the reaction solution compared to its initial viscosity has increased about 350%.

46. The method of embodiments 1, 18, or 29-31, wherein said polyacrylamide is a copolymer of acrylamide/DADMAC.

47. The method of embodiments 1, 18, or 29-31, wherein said copolymer comprises about 1-30 mole % DADMAC and 70-99 mole % acrylamide.

48. The method of embodiment 46, wherein said copolymer is 95/5 mole % acrylamide/DADMAC copolymer.

49. The method of embodiment 46, wherein said copolymer is 80/20 mole % acrylamide/DADMAC copolymer.

50. The method of embodiment 1, wherein said polyacrylamide has a weight average molecular weight of 50,000-200,000 Daltons; and wherein said reaction is quenched at a viscosity in the range of about 20 cP to about 1,000 cP.

51. The method of embodiment 1, wherein said step (a) comprises combining said polyacrylamide with water to obtain a mixture, and adding said glyoxal to the mixture to obtain said reaction solution.

52. The method of embodiment 1, wherein said step (a) comprises combining said glyoxal with water to obtain a mixture and adding said polyacrylamide to the mixture to obtain said reaction solution.

53. The method of embodiment 1, wherein step(a) comprises adjusting the temperature to between about 65-85 deg F.

54. The method of embodiment 1, wherein step(a) comprises adjusting the temperature to between about 60-80 deg F.

55. The method of embodiment 1, wherein step(a) comprises adjusting the temperature to between about 70 to about 75 deg F.

56. The method of embodiment 1, wherein step(a) comprises adjusting the temperature to about 75 deg F.

57. The method of embodiment 1, wherein step (a) followed by step (b) is repeated at least twice.

58. The method of embodiment 1, wherein said pH is monitored in real time.
59. The method of embodiment 1, wherein said pH is measured using at least one pH meter.
60. The method of embodiment 1, wherein said pH is measured using at least two pH meters.
61. A GPAM composition comprising GPAM prepared according to a method of any of the preceding embodiments, wherein said GPAM has a weight average molecular weight of from about 10,000 g/mole to 10,000,000 g/mole and wherein said GPAM has a glyoxal to acrylamide (G/A ratio) in the range of about 0.1:1 to about 20:1.
62. The method of any of the preceding embodiments, wherein the pH of the reaction solution is adjusted to a value in a range from about 4 to about 6.

EXAMPLES

The foregoing may be better understood by reference to the following examples, which are presented for purposes of illustration and are not intended to limit the scope of the invention.

Example 1

Preparation of 95/5 Mole % Acrylamide/DADMAC Copolymer

To a 1500-mL reaction flask fitted with a mechanical stirrer, thermocouple, condenser, nitrogen purge tube, and addition port is added 116.4 g of deionized or soft water, 26.3 g of phosphoric acid, 63.8 g of a 62% aqueous solution of diallyldimethyl ammonium chloride (Nalco Company, Naperville, Ill.), 7.6 g of sodium formate, and 0.09 g of ethylenediaminetetraacetic acid, tetra sodium salt. The reaction mixture is stirred at 400 rpm and the pH adjusted to 4.7 to 4.9 using 17.3 g of aqueous 50% sodium hydroxide solution. The resulting mixture is heated to 100° C. and purged with nitrogen at 50 mL/min. Upon reaching 100° C., 17.6 g of a 25.0% aqueous solution of ammonium persulfate is added to the reaction mixture over a period of 135 minutes. Five minutes after starting the ammonium persulfate addition, 750.9 g of a 49.5% aqueous solution of acrylamide is added to the reaction mixture over a period of 120 minutes. The reaction is held at 100° C. for 180 minutes after ammonium persulfate addition. The reaction mixture is then cooled to ambient temperature and the pH is adjusted to 5.2 to 5.8 using 50% aqueous sodium hydroxide solution or concentrated sulfuric acid. The product is a viscous, clear to amber solution. The product has a molecular weight of about 20,000 g/mole.

Example 2

Preparation of GPAM Onsite

A set of 35 GPAM samples were produced using an on-site procedure (see e.g., FIG. 2). The samples were analyzed for polymer composition using NMR. The samples all showed similar composition to a commercially available GPAM product, BP612. One example (GPAM-1) is shown in Table 1, where the structure of the on-site sample was observed to be very similar to the commercially produced BP612 GPAM.

TABLE 1

NMR results for the commercial GPAM BP612 and a sample produced using the on-site manufacturing method (GPAM-1).

| Sample | Unreacted Glyoxal % | Mono Glyoxal % | Di Reacted Glyoxal % | Unreacted Amide % | Mono Amide % | Di Amide % | BFV, cP | DADMAC:ACAM |
|---|---|---|---|---|---|---|---|---|
| BP612 | 79 | 18 | 3 | 81 | 14 | 5 | 11.3 | 5:95 |
| GPAM-1 | 74 | 22 | 5 | 74 | 18 | 8 | 11.1 | 5:95 |

A paper strength performance test was conducted using samples of a GPAMV (GPAMV-2) produced using the method according to the present disclosure. Three samples were tested in a hand sheet study; using three conditions. One sample was used within one hour of synthesis, one was used after aging for three hours at room temperature, and another was used after aging for three hours at 35° C. The performance of these samples was benchmarked against the commercial GPAM BP612. The hand sheets used in this study were prepared according to TAPPI Method T 205 and were tested for tensile strength (TAPPI Method T 494), burst strength (TAPPI Method T 403), short-span compression strength (SCT, TAPPI Method T 826), and ring crush strength (RCT, TAPPI Method T 822). The results were as summarized in Table 2 and FIG. 3. The results indicated that the strength performance of all three GPAM samples was equivalent or higher than the commercial BP612 GPAM material.

TABLE 2

Results of a hand sheet study conducted using three samples produced using the on-site manufacturing process and commercial BP612 GPAM material.

| Wet End Polymer Sample | Dose (lbs/ton active) | Aging | Percent Change from Blank Tensile Strength | Burst Strength | SCT | RCT | Avg |
|---|---|---|---|---|---|---|---|
| BP 612 | 3.0 | N/A | 6.79% | 7.64% | 8.21% | 2.07% | 6.18% |
| BP 612 | 6.0 | N/A | 12.47% | 14.66% | 10.61% | 3.98% | 10.43% |
| GPAM-2, | 3.0 | <1 h | 7.67% | 16.49% | 8.33% | 4.94% | 9.36% |

TABLE 2-continued

Results of a hand sheet study conducted using three samples produced using the on-site manufacturing process and commercial BP612 GPAM material.

| Wet End | Dose | | Percent Change from Blank | | | | |
|---|---|---|---|---|---|---|---|
| Polymer Sample | (lbs/ton active) | Aging | Tensile Strength | Burst Strength | SCT | RCT | Avg |
| run 1 | | | | | | | |
| GPAM-2, run 1 | 6.0 | <1 h | 13.09% | 23.44% | 11.14% | 7.30% | 13.74% |
| GPAM-2, run 2 | 3.0 | <1 h | 5.21% | 14.56% | 8.47% | 3.58% | 7.95% |
| GPAM-2, run 2 | 6.0 | 3 h | 13.52% | 18.10% | 13.58% | 6.39% | 12.90% |
| GPAM-2, run 3 | 3.0 | <1 h | 6.12% | 9.02% | 8.28% | 1.43% | 6.21% |
| GPAM-2, run 3 | 6.0 | 3 h @ 35° C. | 11.82% | 19.41% | 13.96% | 6.94% | 13.03% |

Average strength improvement of GPAM-2 samples produced using the on-site manufacturing process and the commercial BP612 GPAM material (see FIG. 3).

All references, including publications, patent applications, and patents, cited herein are hereby incorporated by reference to the same extent as if each reference were individually and specifically indicated to be incorporated by reference and were set forth in its entirety herein.

Embodiments of the present disclosure are described herein, including the best mode known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein, then any such conflicting information in such incorporated by reference material is specifically not incorporated by reference herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages and proportions herein are by weight unless otherwise specified. G/A (glyoxal to amide) ratios disclosed herein are based on mole ratios. Further, the NMR results disclosed herein are based on mole ratios.

This completes the description of the preferred and alternate embodiments of the invention. Those skilled in the art may recognize other equivalents to the specific embodiment described herein which equivalents are intended to be encompassed by the claims attached hereto.

We claim:

1. A method of making GPAM onsite, said method comprising:

(a) combining at least a polyacrylamide and glyoxal to obtain a reaction solution; and (b) quenching the reaction by adjusting the pH of the reaction solution to a value in a range from about 2 to about 6 to obtain said GPAM;

wherein said GPAM has a weight average molecular weight of from about 200,000 g/mole to 3,000,000 g/mole; and wherein progress of the reaction is monitored by measuring the viscosity of the reaction solution using an online viscometer;

wherein said viscometer provides continuous real time viscosity measurements via a feedback loop wherein said GPAM has a glyoxal to acrylamide (G/A ratio) of about 0.05:1 to about 20:1.

2. The method of claim 1, wherein said GPAM has a weight average molecular weight of from about 1,000,000 g/mole to 3,000,000 g/mole.

3. The method of claim 1, wherein said GPAM has a glyoxal to acrylamide (G/A ratio) of about 0.4:1 to about 20:1.

4. The method of claim 1, wherein the online viscosity meter comprises:

(a) a transducer assembly comprising:

(i) at least one flow tube inserted into a pipe, said flow tube having a lumen conducting the reaction solution and said flow tube being clamped at an inlet end and an outlet end so as to be capable of vibrating;

(ii) an electromechanical excitation arrangement; and (iii) a sensor arrangement; and (b) meter electronics.

5. The method of claim 1, wherein the reaction is quenched when the viscosity of the reaction solution compared to its initial viscosity has increased more than 100%.

6. The method of claim 1, wherein the pH of the reaction in step (a) is maintained in a range of from about 8 to about 9 by adding a caustic solution wherein said caustic solution is optionally further diluted with water.

7. The method of claim 1, wherein in step (b) said quenching comprises adding an organic acid to the reaction solution.

8. The method of claim 1, wherein said polyacrylamide is a copolymer of acrylamide/DADMAC.

9. The method of claim 8, wherein said copolymer is about 1-30 mole % DADMAC and about 70-99 mole % acrylamide.

10. The method of claim 1, wherein said viscosity meter is an open flow tube viscometer.

11. The method of claim 1, wherein said viscosity meter comprises a measuring system having at least one measuring tube, which in measurement operation is filled with the reaction solution, or through which the reaction solution is flowing, and which has at least one tube section excitable to execute oscillations, an exciter system for exciting at least two wanted oscillation modes of different frequencies, at each of which at least one of the tube sections is excited to execute oscillations, a sensing system, which is embodied in such a manner that it determines for the wanted oscillation modes excited in measurement operation, in each case, a frequency and a damping of a resulting oscillation of at least one tube section excited to execute oscillations of one of the wanted oscillation modes, and an evaluation system, which is embodied in such a manner that it determines, based on calibration data stored in a memory for the individual wanted oscillation modes excited in measurement operation, in each case, based on an excitation determined frequency and damping of the resulting oscillation a shear rate value and a viscosity measured value, wherein the viscosity measured value corresponds to the dynamic viscosity of the GPAM at a static shear rate corresponding to the shear rate value.

12. A GPAM composition comprising GPAM prepared according to a method of claim 1.

* * * * *